Dec. 10, 1940.  R. P. LEWIS  2,224,440
SAFETY CLUTCH
Filed May 28, 1938
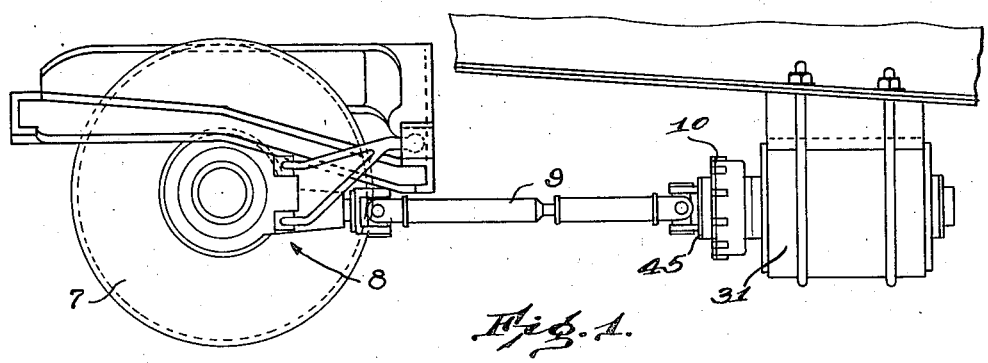
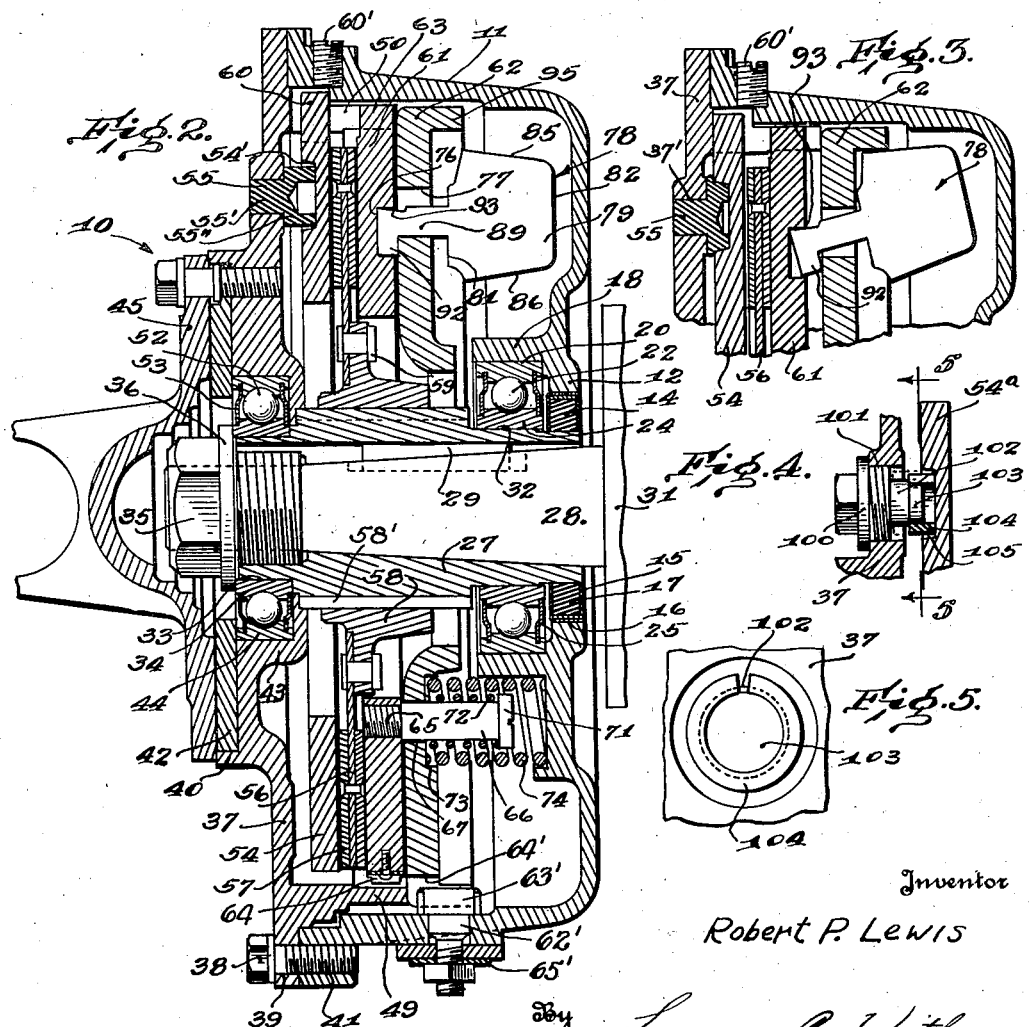
Inventor
Robert P. Lewis
By Lawrence C. Witker
Attorney Patented Dec. 10, 1940

2,224,440

UNITED STATES PATENT OFFICE 2,224,440

SAFETY CLUTCH

Robert P. Lewis, Toledo, Ohio, assignor to Spicer Manufacturing Corporation, Toledo, Ohio, a corporation of Virginia Application May 28, 1938, Serial No. 210,622

12 Claims. (Cl. 192—56)

This invention relates to generally improved clutch and drive mechanisms of the character used for instituting a driving connection between driving and driven means and is more particularly directed to a novel safety clutch of this character through which such means are coupled, together and which is capable of with-standing predetermined overloads incident to normal operation, but which will disrupt the driving connection when excessive and prolonged loads incident to abnormal operation are encountered.

Therefore, an object of the invention is to provide a direct drive from a source of power to a driven unit, wherein the drive is light, strong enough to withstand normal or temporary overloads and which will automatically release when abnormal excessive loads are encountered.

A further object of the invention is to provide a clutch with a driving or driven member including locating elements designed to withstand normal excessive loads but which will automatically cause rapid disruption of the driving connection when abnormal loads or excessive overloads are encountered. More specifically an object of this invention resides in the provision of a clutch with a driving or driven member having a friction plate rotatable therewith and capable of axial movement with respect thereto, located by means of buttons adapted to collapse or soften to disrupt the driving connection in response to excessive heat generated by slippage of the clutch due to abnormal loads.

Another object of the invention is to provide a single plate clutch wherein the friction material is attached thereto and capable of generating considerable heat when slippage occurs which is transferred immediately to the friction plate and consequently the buttons.

More broadly stated, it is an object of the present invention to provide a clutch capable of frictional engagement which will slip under excessive load and if excessive load is maintained for even a short period of time will automatically cause the disruption of the driving connection.

Another object of the invention is to provide a clutch with means to effect the disconnection of the driving and driven elements of the clutch to thereby permit the unit driven thereby to be freely rotated for testing or like purposes.

Still another object of the invention is to provide a clutch with stop means to limit the axial movement of the clutch pressure plate to permit free relative rotation between the driving and driven members upon disruption of the driving connection due to abnormal conditions.

The foregoing and further objects of the present invention will fully appear from a study of the following detailed description when taken in connection with the accompanying drawing, in which:

Figure 1 is a side view illustrating a portion of a railway car or like vehicle and shows one of the modes of employing the clutch mechanism of this invention;

Figure 2 is a vertical sectional view through a form of the invention;

Figure 3 is a fragmentary sectional view of the upper portion of the clutch shown in Figure 2, illustrating the weight there shown in its limiting position against its stop, and showing one of the spacing buttons collapsed in response to heat caused by excessive or abnormal load on the clutch;

Figure 4 is a fragmentary detail view of another form of heat responsive release means; and Figure 5 is a sectional view taken substantially on a line 5—5 of Figure 4.

For the purpose of illustrating a mode of employing the clutch structure of the invention a suitable installation has been shown in Figure 1. A generator unit 31 is suitably secured to a car frame, and is coupled by means of clutch 10 and a propeller shaft 9 to an axle drive mechanism 8 which receives its driving energy from wheel 7. It is to be understood however, that the invention is applicable to many other uses and installations, and Figure 1 is merely illustrative. With particular reference to Figure 2, the clutch generally shown at 10 includes a casing or clutch housing 11 of general cup shape with an entire end open as shown at the left of the view. A relatively small opening is formed at the right end of casing 11 and is defined by an inwardly extending flange 12 adapted to receive and support a combined sealing and lubricant retainer assembly 14. Assembly 14 comprises a pair of telescoped cupped washers 15 and 16 which embrace a washer 17 of felt or other suitable material. Adjacent the flange 12 is formed an interiorly extending concentric flange 18 which serves as one positioning member for a bearing assembly, now to be described.

Closely fitting with flange 18 is an outer bearing race 20 in which are mounted suitable antifriction elements such as ball bearings 22 riding on an inner race 24. Suitable means is provided for preventing escape of lubricant from the bearing to the clutch such as lubricant retaining rings 25 secured in fluid tight relation in grooves formed in outer race 20. The inner periphery of rings 25 only fits in proximate relation to inner race 24 to avoid rubbing friction, and it prevents the leakage of lubricant forced against the outer race through the action of centrifugal force.

Inner race 24 is adapted to rotatably support one end of an exteriorly splined sleeve 27 suitably connected to a driven shaft 28 as by a key and slot assembly as shown at 29 or other similar means. Shaft 28 may in turn be connected to any suitable unit such as indicated at 31 to effect a drive thereof. In the present instance driven unit 31 comprises a generator or compressor or like unit and shaft 28 is rotatably supported therein in bearings (not shown). Sleeve 27 is formed at its outer periphery adjacent one end with a reduced portion 32 of a shape to accommodate race 24 and is provided at its opposite end with a reduced portion 33 positioned to receive an inner race 34 of a second bearing assembly to be described.

Sleeve 27 has a tapered interior and receives a correspondingly tapered end of shaft 28, the end of shaft 28 opposite from unit 31 being reduced in size and threaded to receive a nut 35 in conjunction with a washer 36, the latter cooperating with reduced portion 33 to receive bearing race 34. It will thus be observed that by reason of the tapered fit of shaft 28 within tube 27, the connection of nut 35 therewith and the key assembly 29, shaft 28 is effectively secured to sleeve 27 to rotate therewith and be driven thereby.

A cover plate 37 is provided on the end of casing 11 opposite from flange 12 which is of the same general shape as the cross section of casing 11 and is arranged to be secured thereto by suitable cap screws 38 projecting through holes 39 in plate 37 registering with threaded holes 41 formed in casing 11. Plate 37 is provided with an opening at its center which is defined by an enlarged portion or flange 43 adapted to receive and support an outer race 44 of the second bearing assembly. Suitable anti-friction members such as ball bearings 52 are provided between the races 34 and 44, the escape of lubricant from the bearing being prevented by suitable lubricant retaining rings 53 similar to the rings 25 of the bearing assembly previously described.

Centrally of the cover plate 37 is an annular flange 40 providing a recess within which is received a bearing retainer 42 for the second bearing assembly. The bearing retainer is in turn positioned by means of a plurality of studs threaded into suitable openings in the cover plate. The studs also serve to locate a driving member which in the present instance is a yoke plate 45 of a universal joint structure, the flange portion thereof being secured to the cover plate 37 by nuts threaded onto the studs. Adjacent the periphery of the cover plate 37 is an annular projection 49 adapted to be freely received within the open end of casing 11. The projection 49 is formed with open ended slots 50, preferably arranged at 120° intervals therearound, for a purpose hereinafter described.

With reference to the engaging and disengaging elements of the clutch mechanism, a plate 54 is located interiorly of casing 11 adjacent cover plate 37, and normally serves as a driving plate for the clutch mechanism. The plate 54 is secured against rotation relative to the casing 11 by driving projections 60 thereon, received within the slots 50 in plate projection 49.

Carried by the cover plate 37 are a plurality of spacing or locating buttons or studs 55 preferably six in number, which do not carry any of the driving load between the casing and the plate, but serve to locate the plate 54 in spaced relation with respect to the cover plate 37.

The buttons 55 have a shank portion 55' received within openings 37' in the cover plate 37 and counterbored head portions 55'' received in recesses 54' in the driving or friction plate 54. Buttons 55 may be of any suitable metal or metal alloy, such for example, as zinc combined with relatively small percentages of one or more metals such as tin, copper and aluminum which have a sufficiently low melting point to permit the heat due to abnormal slippage to soften the buttons to a point where engagement between the friction plate 54 and clutch plate, now to be described, is disrupted. When desired or necessary, the buttons 55 are readily replaced, it being only necessary to push the old buttons out of the openings and insert new.

Adjacent the inner face of plate 54, and mounted on and to rotate with sleeve 27, is a driven member or clutch plate 56 preferably formed of thin sheet metal or like material and provided immediately adjacent plate 54 with concentric rings 57 of suitable friction material such as fabric, leather or of any suitable composition. Plate 56 is secured to a hub member 58 by rivets 59, the hub member being splined on its interior to engage splines 58' of sleeve 27, thereby providing means for transmitting power from plate 56 to shaft 28.

In order that proper clearance between the driving plate 54 and clutch disc 57 may be determined, a plurality of inspection holes, through which a gauge may be inserted, is provided around the periphery of the casing 11 and normally closed by means of screw threaded plugs 60', only one of which is shown. Thus, after assembly of the clutch structure, it is possible to determine whether or not proper clearance has been provided to insure disengagement of the driving and driven elements of the clutch when not in operation.

Adjacent the face of ring 57, away from plate 54, is a pressure plate 61 arranged to be moved in a direction parallel to the axis of shaft 28 in a manner to be presently described, and in so doing effect engagement and disengagement of the clutch mechanism. Adjacent pressure plate 61, a reaction member or plate 62 is positioned which is designed for movement in a direction parallel to the axis of shaft 28. The plate 61 is secured against rotation relative to casing 11 by driving projections 63 positioned around the periphery of plate 61 and extending into slots 50 in the cover plate projection 49.

Pressure plate 61 is provided with a plurality of threaded openings 65, preferably corresponding in number to projections 63 on plate 61. Openings 65 receive studs 66 projecting through openings 67 in reaction plate 62 and prevent rotation of the reaction plate relative to plate 61. It will be observed that the mechanism just described establishes a driving connection between plates 61 and 62 and casing 11, and yet permits the plates to undergo axial movement with respect to each other and casing 11. A clearance between bolts 66 and openings 67 is provided, preferably sufficient to allow reaction plate 62 to undergo slight tilting movements for a purpose that will presently appear.

Means are provided in the form of leaf springs, one of which is shown at 64, spaced about the periphery of pressure plate 61 and secured thereto intermediate their ends by any suitable means, the legs of which bear against the projection 49 to resiliently locate or centralize the plate 61 with respect to the axis of the clutch. In order to locate reaction plate 62 with respect to the casing 11, to prevent relative rotary movement but permit axial movement therebetween, a plurality of bolts 62' is positioned in suitable openings in the casing 11 so that their heads 63' engage in transverse slots 64' in the periphery of the plate 62. The bolts 62' are equally spaced about the casing and further serve as means to receive balancing washers 65' on the shanks thereof. By varying the number or size of the washers 65 on the several bolts, the structure may be properly balanced, as will be readily understood.

The studs 66 are provided with enlarged ends or heads 71. Each stud 66 is encircled by a coil spring 72 of a diameter slightly greater than that of the stud. Springs 72 abut recesses 73 provided in reaction plate 62 and act against heads 71 and react against plate 62 and thereby operate to urge plates 61 and 62 together and disengage the clutch mechanism in a manner presently to be described and they will be hereinafter termed hold-back springs. The holdback assemblies are also encircled by compression springs 74 whose ends are received in suitable recesses formed in the interior face of casing 11. Springs 74 urge the driving and reaction plate assembly to the left toward the driven member, and although in the present embodiment of my invention, the preferred number of such spring assemblies is six, it is to be understood that the number thereof may readily be varied and it is not intended to restrict the exact number that may be used.

As just explained, the pressure and reaction plate assembly is urged to the left toward the clutch plate 56 by springs 74, and in order to prevent the latter from bringing the pressure and clutch plates into engagement when the prime mover is operating below a predetermined speed, I preferably arrange the reaction plate 62 to abut the end of cover projection 49 to limit movement of the reaction plate to the left by engagement therewith. Although I have illustrated one particular form of means for exerting a movement limiting action on plate 61, it is to be understood that any other suitable means may be employed for effecting this result without departing from the spirit of the present invention. However, it will be clear that the projecting flange 49 serves as means for providing clearance between plates 54 and 61 and the clutch facings 57 which enables the generator 31 to be motored, or any other unit connected in place thereof to be freely rotated, for test, repair or adjustment purposes without the necessity of releasing or fastening any of the elements.

With reference to the speed responsive means for effecting engagement and disengagement of the clutch mechanism, any suitable speed responsive mechanism may be utilized, but in the present embodiment of my invention it comprises centrifugally operable mechanism. To this end, plate 61 is provided, on the face opposite to that cooperating with driven plate 56, with a series of recesses, one of which is indicated at 76. Recesses 76 are preferably rectangular in shape with the longer dimension of the rectangle running as a portion of a chord across driving plate 61. Recesses 76 are of like number and correspond in position to a series of apertures 77 of general rectangular shape formed in reaction plate 62.

While on the opposite faces of plate 62, apertures 77 are rectangular in shape, it will be observed that the rectangles are of different size and the sides of the apertures nearest the periphery of plate 62 are spaced from corresponding sides of the apertures in plate 61 and hence afford a clearance, the purpose of which will be hereinafter described.

A series of speed responsive elements or weights 78 with levers 89 thereon are provided in apertures 77 of plate 62. Each element 78 comprises a weight 79 of the hexagonal shape illustrated, with opposite parallel faces 81 and 82 substantially equal in length. Opposite sides 85 and 86 are not only of different lengths but are not parallel.

At the opposite end of lever 89 and preferably formed integral therewith, is a head 92 of substantially the same size and shape as recess 76 with the exception of the face nearest the periphery of plate 61, which is preferably bevelled as shown at 93. Head 92 is of somewhat greater depth than recess 76 and projects therefrom a substantial amount to space plates 61 and 62 apart against the action of springs 72.

With the driving member rotating below the engaging speed of the clutch, the parts assume the positions shown in Figure 2 and with the parts so disposed, the operation of this preferred embodiment of the clutch of my invention in response to acceleration of the driving member, will now be described. The direction of power transmission is normally from yoke plate 45 to unit 31. In the position shown in Figure 2, the various elements are in idling position wherein no power is being transmitted. It will be observed that clutch plate 56 is free from positive contact with driving plate 54 as well as the driving face of pressure plate 61, plate 61 being held back against contact with driven plate 56 by springs 72 acting against reaction plate 62, which in turn is held in the position shown in Figure 2 by reason of engagement of its peripheral edge with the end of projection 49. Shaft 28 and casing 11 are thus free to rotate relatively to one another.

Casing 11 is rotated from a suitable source of power and as the speed of rotation increases above a predetermined idling speed, centrifugal force acts upon weights 79 and causes them to rock outwardly toward the periphery of casing 11. As they rock, levers 89 are carried therewith and heads 92 tilt and are partially removed from their position in recesses 76. Levers 89 rock about the edges of faces 93 which are seated in the outermost corners of recesses 76, and in so doing, the rear faces of heads 92 react against the contacting faces of reaction plate 62 through reaction faces or edges 94 formed on heads 92. This movement of heads 92 causes driving plate 61 and reaction plate 62 to separate against the action of springs 72, and results in driven member 56 being frictionally gripped between plate 61 and plate 54 of casing 11. When the driven member has been frictionally gripped in the manner just described, movement of plate 61 under the influence of weights 78 is substantially arrested, and further outward rocking movement of weights 78, in response to a further increase of speed of the driving member, causes reaction plate 62 to move to the right out of engagement with projection 49, against the action of springs 74. Upon initiation of this operation, a torque of low and slowly increasing magnitude is transmitted from the driving to the driven plates, and as the operation proceeds, in response to continued acceleration of the driving member, pressure is built up on springs 74 and between the surfaces of the plates. As the speed increases, the plate pressure increases. This proportional increase is desirable since it affords means by which slippage of the clutch may occur at the lower speeds when the power connection is first being established and the prime mover is initially picking up the load, thus avoiding any jerky engagement which may prove injurious to the clutch or the unit being driven.

As the engaging operation is proceeding, and reaction plate moves to the right and builds up pressure in springs 74, it is apparent that should the weights 78 move unevenly, or irregularly, and tend to apply a greater force to one or more localized portions of plate 61, plate 62 may tilt or rock slightly and tend to compensate for such action and thereby insure the application of substantially uniformly distributed forces to plate 61.

Continued increase in the speed of rotation of casing 11 causes weights 78 to swing outwardly to a greater extent and increase the pressure between the driving and driven elements 79 contact with a flange 95 preferably integrally formed with reaction plate 62. Flange 95 prevents further movement of weights 79 and insures the maintenance of a constant pressure between the contacting elements at all higher speeds of rotation. The relation of the parts under these conditions is illustrated in Figure 3.

As the speed of rotation of casing 11 decreases, the action of the clutch will be just the reverse of that described above. Springs 72 force plates 61 and 62 together and bring weights 78 into their inner or disengaged positions and springs 74 force plate 62 against flange 49 against action of the decreasing centrifugal force tending to force weights 78 outwardly. As plates 61 and 62 come together, pressure between the driving and driven elements is released and an idling phase is again established.

From the foregoing description, the operation of the clutch during normal driving conditions and under normal loads will be clearly understood. Likewise, it will be understood that under abnormal conditions, for example, when excessive or abnormal load is imposed upon the clutch, means have been provided to disrupt the driving connection so that there will be free relative rotation between the casing 11 and the clutch plate 56. The buttons 55 being of suitable meltable material become heated due to the heat of friction between the friction plate 54 and clutch plate 56 as a result of such abnormal slippage, resulting in the melting down or collapsing of the buttons sufficiently to permit the plate 54 to be forced away from the clutch plate due to the action of springs 74, to provide sufficient clearance and permit relative rotation between plate 54 and the clutch plate, also shown in Figure 3. It will be noted that due to the fact that weights 78 have reached the limit of their outward movement by reason of engagement with the flange 95, such arrangement provides a means for limiting the movement of pressure plate 61 to permit the free rotation of clutch plate 56 when the buttons 55 have collapsed to thereby disrupt the driving connection between plates 54, 56 and 61 and thus between the casing 11 and shaft 28. It is to be further noted that the buttons 55 do not shear upon becoming softened due to the positive driving connection between the projections 60 and slots 50.

It is to be understood that other material may be utilized for the buttons. For example, synthetic materials such as plastics which have a suitable low melting point may be used as well as any other material having similar characteristics. The invention also contemplates the use of other heat responsive means for disrupting the driving connection, and with reference to Figures 4 and 5, the means there shown comprises a threaded plug 100 engageable with a threaded aperture 101 in cover plate 37. The plug 100 has a cylindrical reduced portion 102 with a further reduced portion 103, normally embraced by a split spring ring 104. The ring engages a recess 105 in the friction plate 54a and serves to normally space the plate with respect to the plate 37. Spring ring 104 is capable of expansion in response to heat, being a bi-metallic element or having like characteristics. Accordingly, upon expansion of ring 104 in response to the heat generated by slippage resulting from abnormal overload as above described, the ring moves to embrace the larger portion 102 of the plug, thus permitting the friction plate to move away from the clutch plate.

Therefore a clutch has been provided which is not only capable of automatic engagement and disengagement during normal operation, but also capable of slipping in response to abnormal load or overload for completely disrupting the driving connection, and thereby prevent damage to the clutch and mechanisms coupled thereby. Furthermore, should it be desired to operate unit 31 in a direction opposite to its normally driven direction, for example for testing or like purposes, it will be clear that when the clutch is idle, clutch plate 56 and thus shaft 28 are freely rotatable. Thus, the clutch has particular utility in railway car installations for example, where it is desirable to drive unit 31 in either direction, as from the car wheels or from a source of electrical energy, such as batteries. Accordingly, the unit 31 may be a generator when driven in one direction and a motor when driven in the opposite direction and capable of operating auxiliary equipment, such as an air conditioner, not only when the car is moving but also when the car is standing.

Although the foregoing description relates more particularly to an automatic clutch, it is to be understood that the safety features, as well as the general arrangement of the elements can be incorporated in other types of clutches.

What I claim is:

1. In combination, a load to be driven; a source of power, exceeding the normal load for driving said load; a clutch for inter-connecting said power source and said load, said clutch being engaged under normal load to form a driving connection between said power source and said load, and arranged to slip under excessive or abnormal load; and temperature responsive means in said clutch for normally positioning and for permitting relative axial movement between clutch elements for disrupting the driving connection between said source of power and said load in response to slipping.

2. The combination defined in claim 1 wherein the temperature responsive means comprises a plurality of meltable metallic buttons.

3. In a clutch, the combination of a casing, a driven member in said casing, a driving member in said casing rotatable therewith and movable axially thereof, and temperature responsive means for positioning said driving member axially of said casing and in driving relation with respect to said driven member, said temperature responsive means being adapted to disrupt the driving connection between said driving and driven member in response to the heat generated by abnormal slipping between said members.

4. In a clutch having a casing, a driving element, a driven element, a collapsible spacing member between the casing and one of said elements, said member serving to position said element in driving relation with respect to said other element during normal operation of said clutch and to disrupt the driving relation between said elements in response to abnormal operation of said clutch.

5. In a clutch, the combination of a casing, a friction plate rotatable with said casing and movable axially thereof, heat responsive means between said casing and said plate for normally positioning said plate, and a member in said casing adapted to be driven by said casing and arranged to slip relative to said plate in response to abnormal load, said heat responsive means being collapsible to permit the plate to move axially of said casing to disrupt the drive between said casing and said driven member.

6. The combination defined in claim 5 wherein said heat responsive means comprises a plurality of spaced meltable metallic buttons.

7. In a clutch, the combination of a casing, driving and driven members in said casing, means for establishing a driving connection between said members and for permitting slipping between said members when the clutch is overloaded, and means for disrupting the driving connection upon such excessive slipping, said means comprising an element for normally positioning one of said members with respect to said other member and said casing.

8. In a clutch, the combination of a casing, a driving plate, a pressure plate, a friction plate interposed between said driving and pressure plates, means for urging said pressure plate into engagement with said friction plate and said friction plate into engagement with said driving plate, said means permitting slipping between said plates in response to abnormal or excessive loads, and means between said casing and said driving plate for normally positioning said driving plate in driving position, said means being collapsible in response to heat generated by abnormal slipping to release said driving plate from driving position.

9. The combination defined in claim 8 wherein said collapsible means comprise a plurality of meltable buttons.

10. The combination defined in claim 8 wherein said collapsible means comprise a plurality of bi-metallic thermo-responsive buttons.

11. In sub-combination in a clutch of the class described, a casing, a plate rotatable with and axially movable with respect to said casing, and a stud carried by said casing and engageable with said plate for normally limiting axial movement thereof in one direction, said stud having a meltable head portion which when collapsed permits axial movement of said plate in such direction.

12. In sub-combination in a clutch of the class described, a casing, means in said casing for establishing a driving connection between a driving and a driven element, and a collapsible button carried by said casing for disrupting the driving connection in response to heat generated by excessive slipping between said elements.

ROBERT P. LEWIS.